Jan. 11, 1944.                R. B. MUSE                 2,339,097
                            CUTTING OFF MACHINE
                          Filed Sept. 5, 1942          5 Sheets-Sheet 1
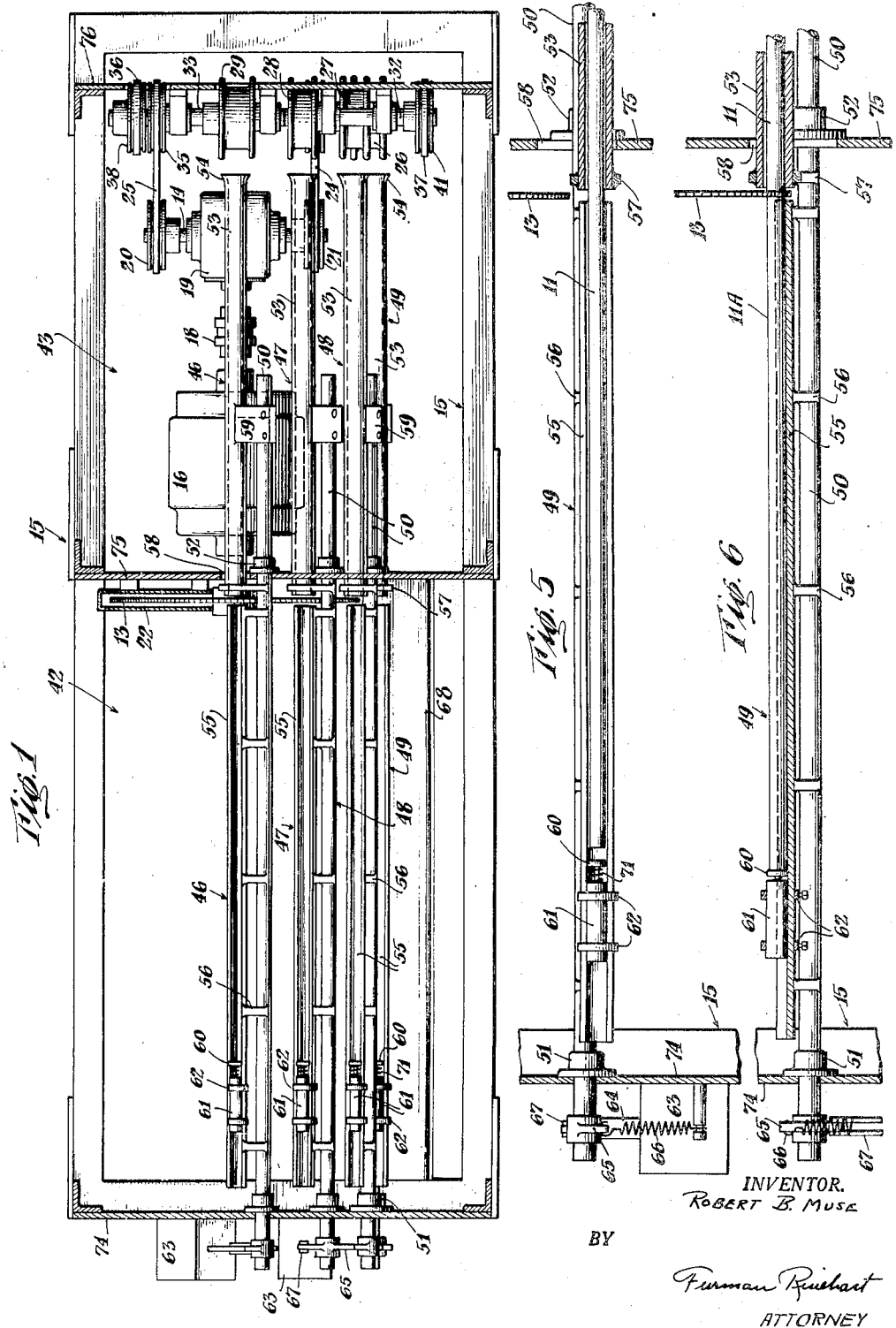
INVENTOR.
ROBERT B. MUSE
BY
Furman Rinehart
ATTORNEY

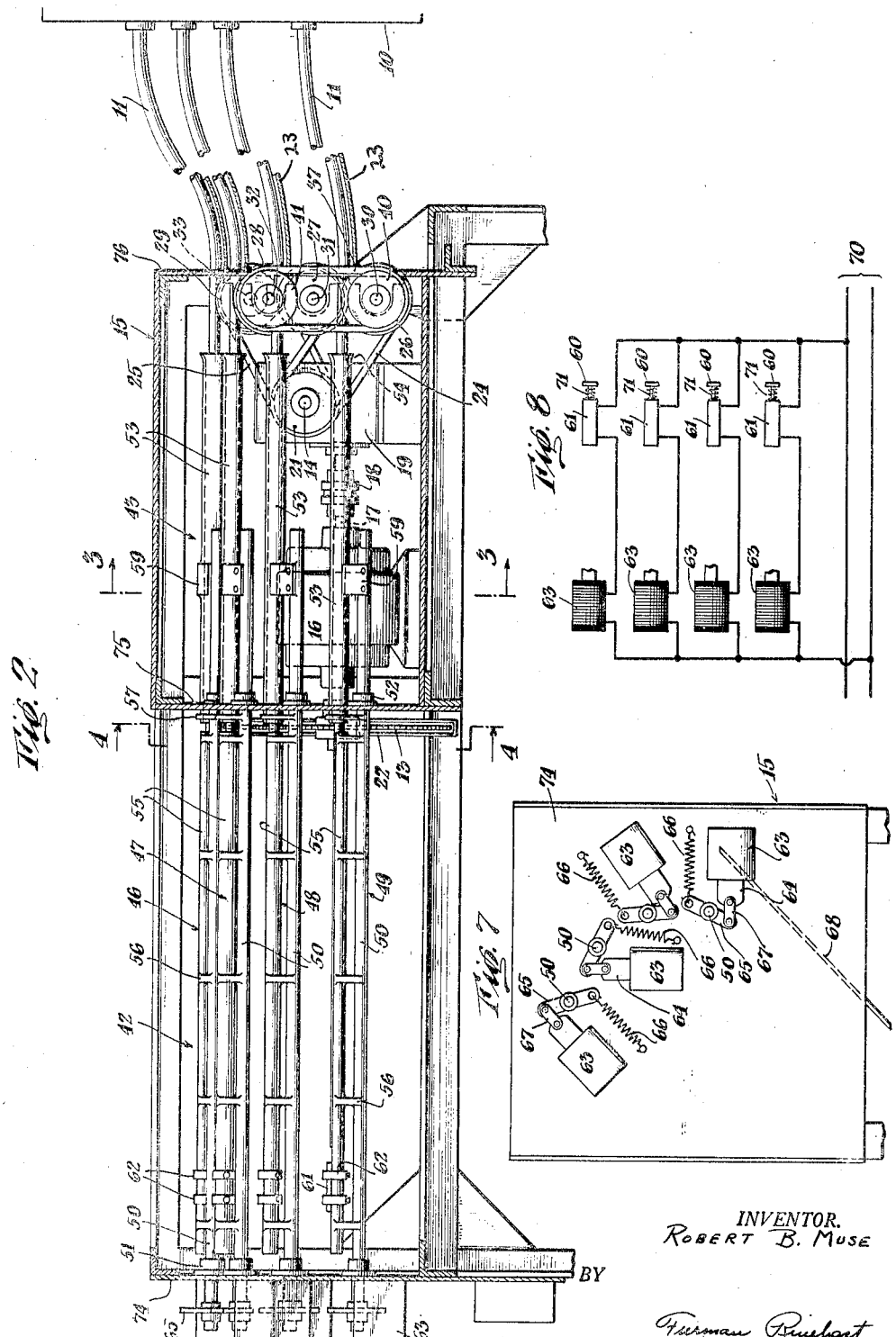

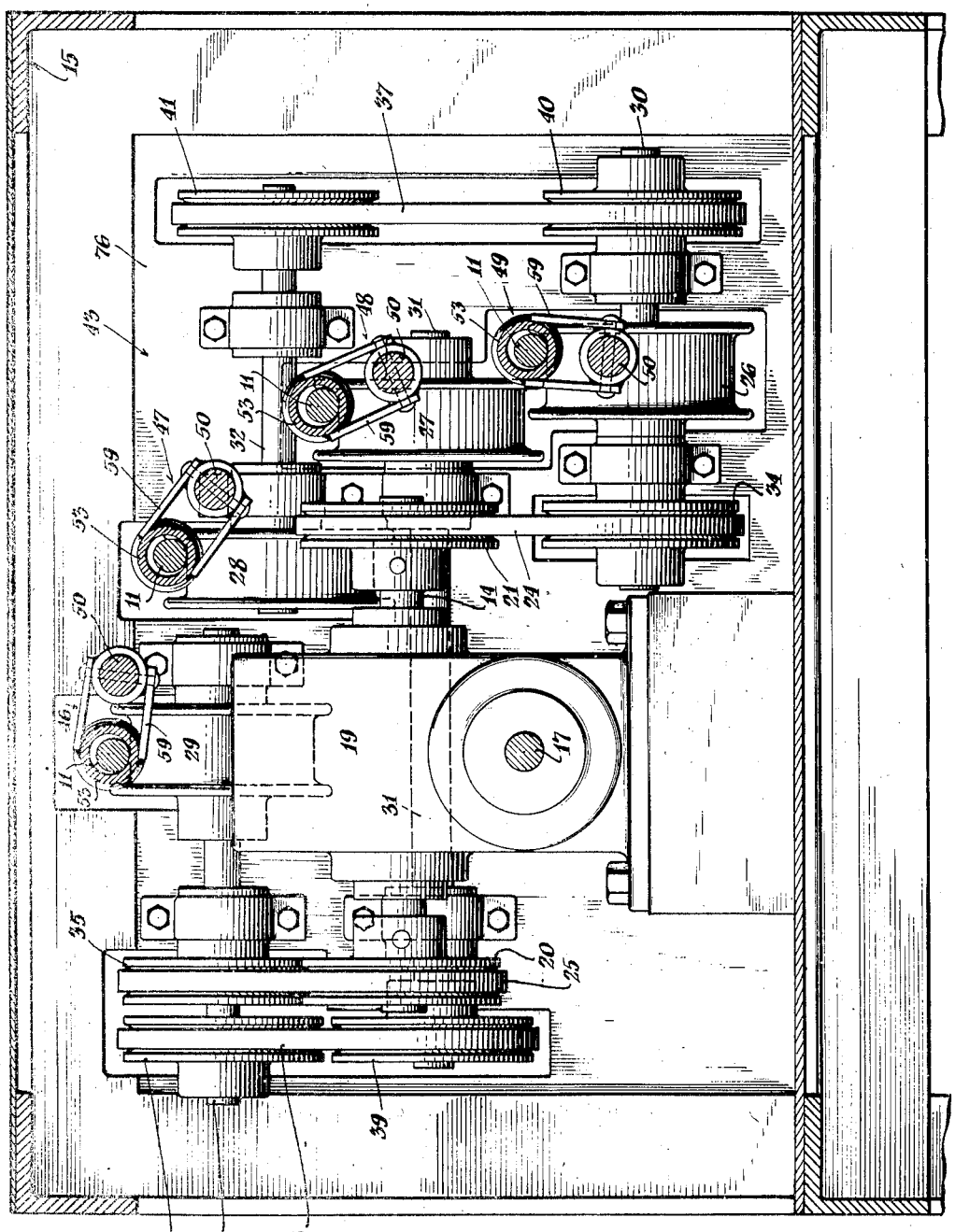

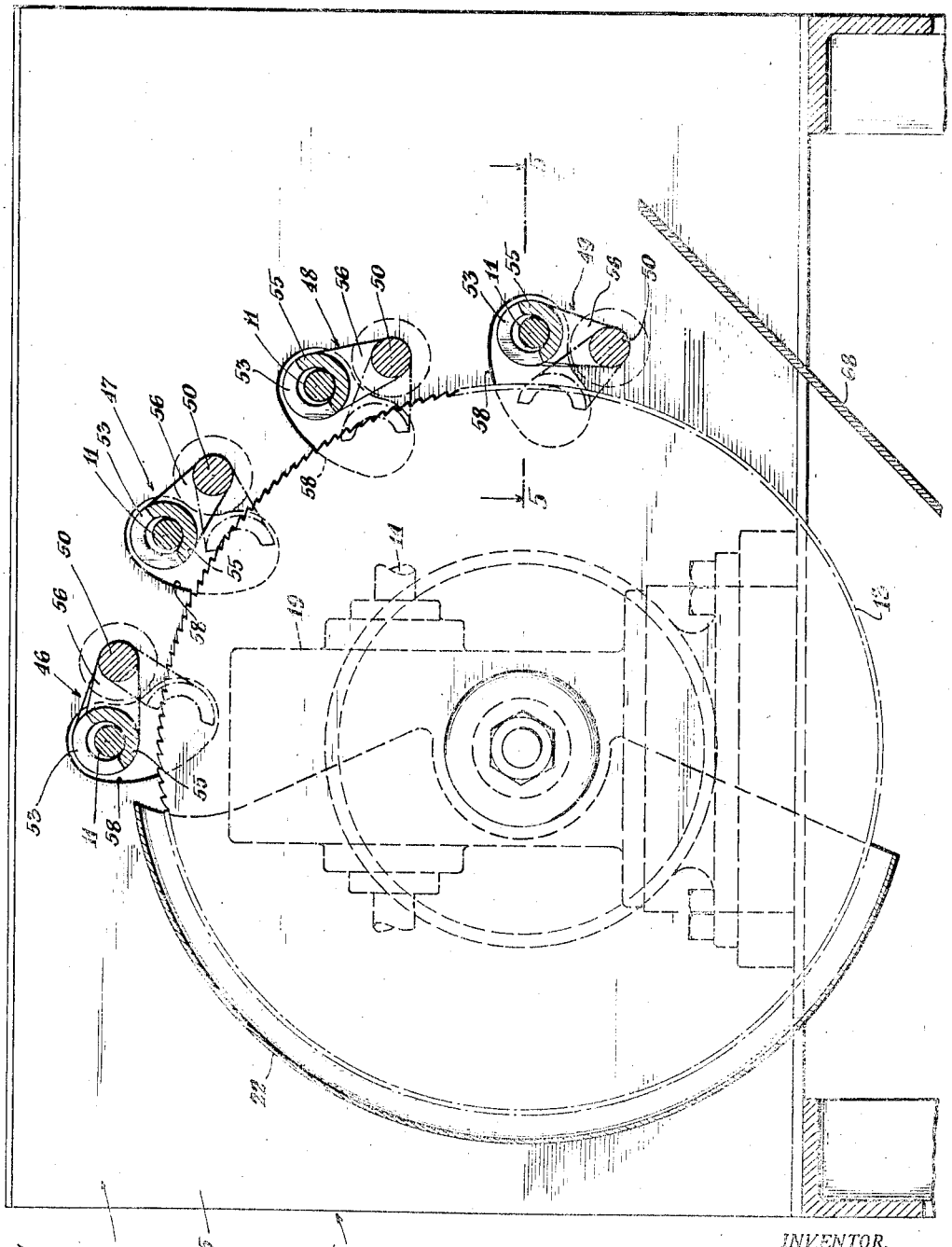

Patented Jan. 11, 1944

2,339,097

UNITED STATES PATENT OFFICE 2,339,097

CUTTING-OFF MACHINE

Robert B. Muse, Orinda, Calif., assignor to American Smelting and Refining Company, New York, N. Y., a corporation of New Jersey Application September 5, 1942, Serial No. 457,425

12 Claims. (Cl. 29—69)

The invention relates to cut-off and delivery mechanism and more particularly such a mechanism for cutting off streams of flexible solid material such as solder.

According to a preferred embodiment of the invention, the machine comprises a suitable framework supporting a drive motor driving a circular saw and also driving a plurality of feed rolls. The flexible streams of material are fed to the several feed rolls which in turn deliver the material to suitable guide devices disposed around the periphery of the saw. These guide devices may each comprise a guide tube anterior of the saw and a receiving trough posterior of the saw. Suitable rock shafts may independently support the sets of guide tubes and guide troughs for independently rocking the several streams into the saw to cut off lengths thereof. Each guide trough may have an adjustable stop device for stopping the stream momentarily to measure a desired length. Suitable electrical control devices may be provided, controlled by said stop devices, for quickly rocking the particular guide device to carry its stream into the saw after which the position of the trough is such that the cut-off length drops into a suitable hopper.

While this machine may be used for cutting into lengths many different materials in stream form, such as wire, pipe, rods, etc., it is especially adapted for cutting streams of relatively soft material such as wires of solder, zinc, die-cast metal, aluminum, etc. The individual streams operate absolutely independently of each other and the cutting movement is so fast that there is no interruption in stream movement and no complicated adjustment of the saw is necessary to correlate it to the stream movement.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 represents a plan view partly in section of the machine;

Fig. 2 is a vertical elevation partly in section of the machine;

Fig. 3 is a transverse section on the line 3—3 of Fig. 2 illustrating the driving mechanism for the drive rolls.

Fig. 4 is a transverse section on the line 4—4 of Fig. 2 illustrating the position and operation of the guide devices;

Fig. 5 is a detailed section taken on the line 5—5 of Fig. 4 and illustrating the construction of one of the guide devices in its outer position away from the saw;

Fig. 6 illustrates a view similar to Fig. 5 showing the guide device after it has moved the stream into the saw;

Fig. 7 is an end elevation of the frame of the machine; and

Fig. 8 illustrates diagrammatically an electrical wiring diagram showing how the stop devices operate the solenoids which swing the streams into the saw;

Figure 9:
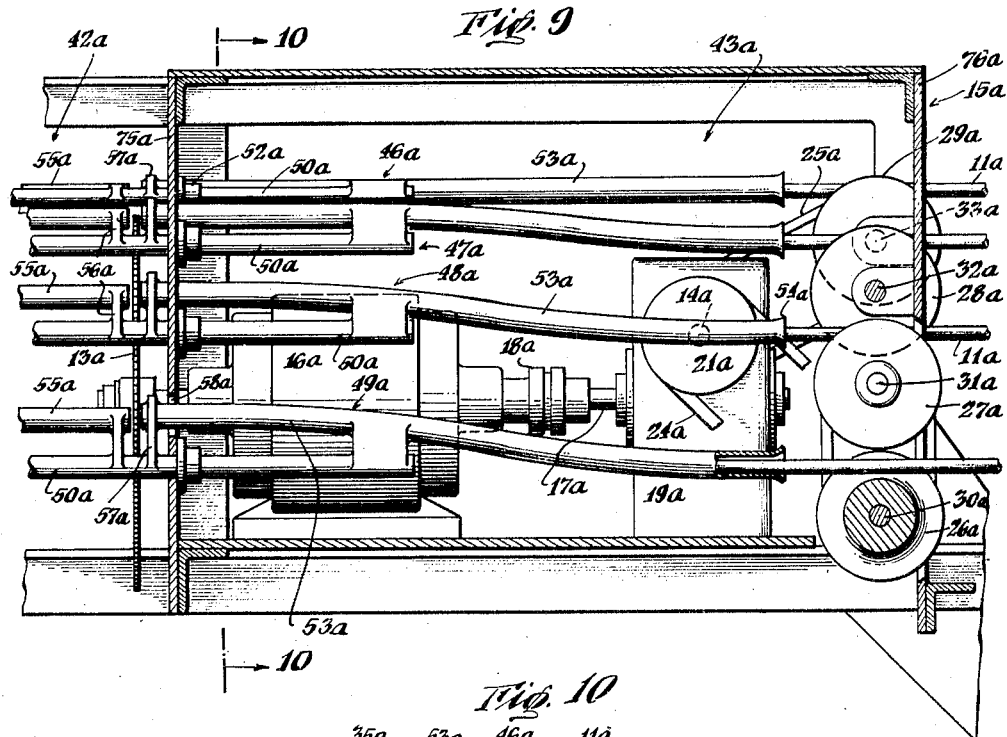
Fig. 9 is a fragmentary vertical elevation partly in section of a modified form.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Figs. 1 and 2, the cutting and delivering machine is illustrated in use with a die press, indicated by 10, of the kind usually used for extruding wires of solder. The streams of solid solder are indicated by 11. These streams may have a circular cross-section or a star shaped cross-section, or any other cross-section necessary or desirable for the finished product. The several streams 11 pass into the guide devices, four of which are shown for purposes of illustration and identified by the reference characters 46, 47, 48, 49. These guide devices carry the streams 11 past the circular saw 13, the streams 11 being propelled by suitable propeller rolls 26, 27, 28, 29 (Fig. 3).

The machine frame is indicated by 15 and is preferably spaced a certain distance from the die press 10 so that the streams 11 may extend unsupported for a certain distance for purposes which will hereafter appear. If the distance be too great, supporting troughs 23 may be provided for a part of the distance.

The framework 15 comprises end walls 74 and 76 with an intermediate wall 75 forming compartments 42 and 43. Supported on the framework 15 is an electric motor 16, having its shaft disposed parallel to the longitudinal axis of the machine. Disposed on the posterior side of the motor is a circular saw 13 having a suitable stationary arcuate guard 22 secured to the adjacent frame of the machine (Fig. 4).

Anterior of the motor 16 is a shaft coupling 18 (Fig. 1) which is connected to the input shaft of the gear reducer 19 having an output shaft 14 supporting pulleys 20 and 21 on opposite sides thereof. These pulleys drive the four feed rolls 26, 27, 28, 29 by a suitable belt and pulley arrangement.

Referring now also to Fig. 3, the lower roll 26 is mounted upon a lower shaft 30; the lower intermediate roll 27 is mounted upon a lower intermediate shaft 31; the upper intermediate roll 28 is mounted upon an upper intermediate shaft 32 and the upper roll 29 is mounted upon an upper shaft 33. All of these roll shafts are suitably journalled in the frame of the machine. The upper shaft 33 constitutes a master shaft in that it also supports two pulleys 35 and 38, the pulley 35 supporting a belt 25 which is driven by pulley 20 mentioned above. The lower roll shaft 30 also constitutes a master shaft having two pulleys 34 and 40, the pulley 34 supporting a belt 24 driven by pulley 21 mentioned above. The lower intermediate shaft 31 has a pulley 39 driven by belt 36 which is driven by pulley 38. The upper intermediate shaft 32 has a pulley 41 driven by belt 37 which is driven by pulley 40.

Thus, the several grooved rolls 26, 27, 28, 29 have their upper surfaces disposed generally in line with the belled ends 54 of the several guide tubes 53 of the guide devices 46, 47, 48 and 49.

The several guide devices 46, 47, 48, 49 are substantially stationary except for a limited rocking movement necessary to carry the streams into the saw 13. Since all of these guide devices are disposed around the periphery of the saw 13, as indicated particularly in Fig. 4, and are of similar construction, it is only necessary to describe one guide device in detail.

Referring now also to Figs. 5 and 6, the guide device 49 comprises a rock shaft 50 journalled in end wall 74 and in intermediate wall 75 by bearings 51 and 52. It will be noted from Fig. 1 that the rock shaft 50 extends into the compartment 43 and supports the guide tube 53 in cantilever style by bracket 59; the straight guide tube 53 passes through an arcuate clearance space 58 in the wall 75 to permit the arcuate movement of the guide device and this tube 53 is supported in compartment 42 by bracket 57.

Spaced from the guide tube 53 and in line therewith is an open-top straight guide trough 55 supported on the rock shaft 50 by a plurality of brackets or arms 56. Closing the posterior end of the trough 55 is an adjustable stop 60 mounted upon a holder 61 adjustably clamped by clamps 62 around the trough 55. Thus, by loosening the clamps 62 and sliding the holder 61 lengthwise of the trough 55, the length of the cut-off piece 11A may be adjusted, as will hereafter more fully appear.

The several rock shafts 50 are individually driven by separate power solenoid mechanism illustrated more specifically in Figs. 7 and 8. Mounted upon the posterior side of wall 74 are a series of solenoids, one for each guide device 46, 47, 48, 49, each solenoid mechanism being of similar construction so that it is only necessary to describe one in detail.

Mounted upon the end of rock shaft 50 is a double arm 65, one end of which is pivoted to a link 67 which in turn is pivoted to a plunger 64 of the solenoid 63; the other end of arm 65 is secured to a spring 66 which is anchored on the stationary end wall 74. It will thus be seen that the springs 66 normally hold the guide devices with their streams 11 out of engagement with the saw 13 but, when the solenoids 63 are energized, the shafts 50 are quickly rotated against the springs 66, quickly moving the several streams 11 into the saw 13 cutting off the lengths 11A.

The solenoids 63 are controlled by the stop block 60 through suitable electric wiring, indicated diagrammatically in Fig. 8. It will be understood that the stop blocks 60 are maintained outwardly by springs 71 which normally hold open the electric contacts (not shown) in holders 61. The contact devices in holders 61 are in series with their solenoids 63 and the several arrangements are connected in parallel across a source of power 70 so that each solenoid may operate entirely independently of the other. Instead of having the contact devices 61 connected directly in series with the solenoid 63, suitable power relays (omitted for simplicity) may be interposed, as will be understood by those skilled in the art.

In operation, the several streams 11 extruded by the die press 10 may be carried across an open space and into the feed rolls 26, 27, 28, 29, suitable supporting troughs or channels 23 being interposed in case the space between the cutting machine and the die press is too great to leave the streams 11 entirely unsupported. The friction caused by the grooves in the feed rolls feeds the streams into the guide tubes 53 and thence past the saws 13 into the guide troughs 55 whence they contact the stop blocks 60. The stop blocks 60 close the contacts in holders 61 which immediately energize the respective solenoids 63 which move the several rock shafts 50 with their guide tubes 53 and guide troughs 55 each as a unit, carrying the streams 11 into the saw 13 immediately and quickly cutting off lengths 11A. The rocking movement of the troughs 55 brings them into such position that the cut-off lengths 11A are dumped out whence they fall upon a suitable chute 68 which guides them to a suitable receptacle.

It will be understood that the length of the cut-off pieces 11A may be adjusted by adjusting the clamps 62 for holder 61 on the trough 55. If desired, the several troughs 55 may be adjusted to give the cut-off pieces all the same length, or each trough 55 may be adjusted to give a cut-off piece 11A of a different length from the others.

Due to the speed with which the cuts are made by saw 13 and due to the flexibility of the material of the streams 11 and due to the streams being unsupported for a considerable distance between die 10 and the cutting machine, a certain lateral yield or shift in the streams can take place and no interruption or retardation is caused in the stream flow out of the die press 10 by the momentary stoppage of that portion of the stream anterior of the saw during the instant cutting takes place. As soon as the guide devices withdraw the streams from the saw, the feed rolls immediately take up the slight slack in the streams which is piled up at the unsupported part thereof due to the momentary stoppage of the streams; and the feed rolls feed the streams from the tubes 53 into the troughs 55 where they contact the stop blocks 60 and thereby cause the next cutting operation.

The feed rolls 26 to 29 may normally have a peripheral speed slightly in excess of the speed at which the streams are extruded from the die press 10 to take care of the momentary slight piling up in the streams due to the cutting-off operation. The frictional engagement between the rolls and the streams permits the rolls to slip with respect to the streams while they are momentarily stopped during the cutting operation and their slight extra speed moves the portions of the streams which they contact at a higher rate to take up the slack in the streams.

Although four streams are shown, a greater or lesser number may be provided for by suitable changes in structure. By the very nature of the machine, the operation of each stream is independent of the other and the several streams of metal may move at different speeds and the cutting off operations of the different streams may occur at different times.

If desired, instead of having the streams brought downwardly by gravity from the die press to the cutting machine, they may be moved upwardly or in a horizontal plane, and the angle of the feed rolls may be made sharper for increased friction if necessary.

The rocking movement of the guide devices is so rapid that there is no appreciable slowing up of the metal stream coming to the machine and, in the forms shown, only one motor of one-half horse power is necessary to drive the entire cutting machine.

If desired, the different streams may come from dies of the same or different diameter or shape. In the event the streams are of different diameter or shape and also in the event that the different troughs are producing rods of different length or weight, a plurality of diverting chutes may be provided to divert the different products into different containers from which they may be separately packaged.

Figure 10:
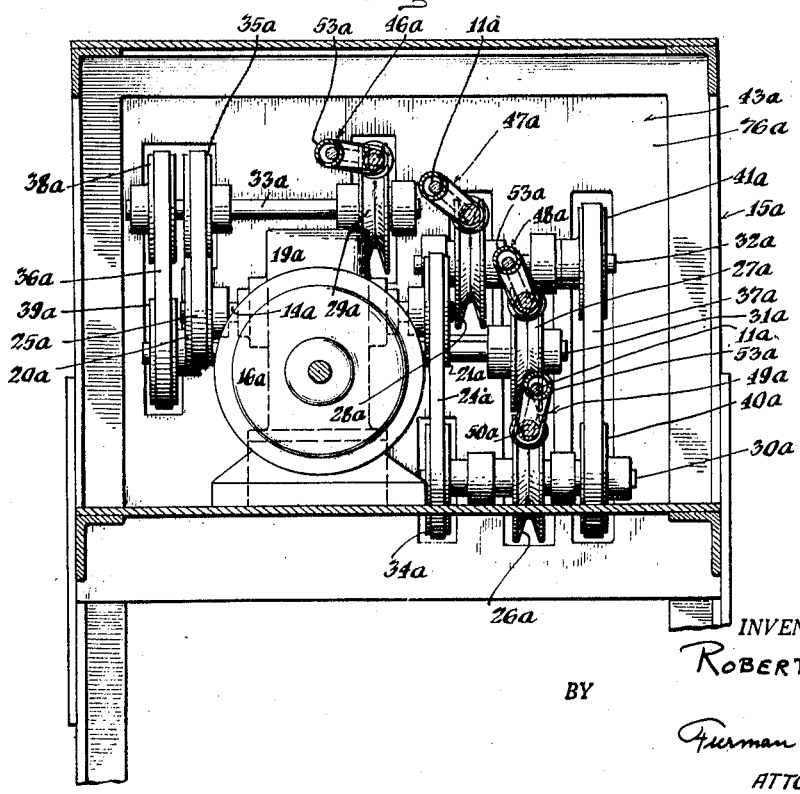
Fig. 10 is a section on the line 10—10 of Fig. 9.

Referring now to Figs. 9 and 10, the corresponding parts in the modified form are denoted in general by the same reference characters but followed by the letter $a$. In this form, the construction is similar to that of the first form, the guide tube 53$a$ is curved so that its bell mouth 54$a$ is in line with the axis of the rock shaft 50$a$. Further, the propeller roll 26$a$ has a V-shaped groove instead of a flat bottom or square groove as in the propeller roll 26 in the first form. The path of movement of the stream through the V-shaped groove is substantially in line with the bell shaped mouth 54$a$. The placing of the bell mouth 54$a$ on the axis of rock shaft 50$a$ has the advantage of keeping the path of the solder stream stationary as the guide tube is given its rocking movement to cut off lengths of solder.

The V-grooved rolls in general apply more traction to the solder streams than the square grooved rolls, and, like the square grooved rolls, can handle different diameters of solder. The straight guide tubes, however, have the advantage of offering less resistance to the solder stream than the grooved tubes. In either of the above forms, the maximum diameter or cross dimension of the stream will be substantially less than the inside diameter of the guide tube to insure complete freedom of movement. For example, for a guide tube of ½ inch inside diameter, the maximum diameter of solder may be from ⅜ inch to 7/16 inch.

The method of operation of the second form is substantially the same as the method of operation of the first form and will therefore be readily apparent from the description of the operation of the first form.

Thus, a multi-stream cutting machine is provided which is simple and efficient in operation. There is nothing to get out of order. The flexibility of the streams and design of the machine take care of the momentary stoppage of the streams during cutting and it is not necessary to go to complicated construction to provide a compensating movement of the saw with the stream during the cutting thereof. Furthermore, the several streams, being absolutely independent of each other, may be operated independently, as described above, as to speed, length or diameter of product.

While certain novel features of the invention have been disclosed and are pointed out in the annexed claims, it will be understood that various omissions, substitutions and changes may be made by those skilled in the art without departing from the spirit of the invention.

What is claimed is:

1. In a machine of the character described, means for feeding a continuous stream of solid material, a guide device for said stream, a saw having a blade whose position is fixed transverse to the direction of movement of said stream, a stop to engage the free end of said stream which causes said stream to stop its longitudinal movement momentarily when the stream engages said stop, and means for moving said stream transversely of itself into the saw, the guide and the flexibility of the stream permitting such lateral movement and permitting momentary stoppage of the stream flow during cutting.

2. In a machine of the character described, means for feeding a continuous stream of solid material, a guide device for said stream, a saw having a blade whose position is fixed transverse to the direction of movement of said stream, a stop causing the stream to stop its longitudinal movement momentarily, and means for relatively moving said guide device and blade transversely to said direction of movement when said stream is stopped in its longitudinal movement, the guide and the flexibility of the stream permitting such transverse movement and permitting momentary stoppage of the stream flow during cutting.

3. In a machine of the character described, a stationarily mounted moving saw, means for feeding a plurality of streams of material past said saw, and control devices for each stream, operating independently of the other, for moving the streams into the saw to cut off lengths thereof, each of said control devices comprising a stop for each stream actuated by engagement of the stream therewith and to momentarily stop the engaged stream, and a solenoid operative upon actuation of said stop to move the engaged stream transversely of its length across the cutting teeth of said saw when said stream is thus stopped.

4. In a machine of the character described, a stationarily mounted circular saw, guides arranged around the periphery of said saw for feeding a plurality of streams of material past said saw, and control devices for each stream operating independently of the other for moving said guides laterally of the streams into the saw to cut off lengths thereof, said control devices comprising an actuating stop for each stream and an electrically operated solenoid responsive to the actuation of said stop to cause movement of said guides laterally when a stream engages said stop.

5. In a machine for sawing a plurality of streams of material into lengths, a saw, guide devices for guiding said plurality of streams past said saw, said guide devices being interrupted at the saw, stop devices on said guide devices for momentarily stopping the stream, and electrically operated solenoids controlled by said stop devices for causing movement of said guide devices to carry said streams against said saw to cut off said lengths.

6. In a machine for sawing a plurality of streams of material into lengths, a circular saw, guide devices for guiding said plurality of streams past said saw, said guide devices being disposed around the periphery of said saw, said guide devices being interrupted to provide clearance for the saw, stop devices on said guide devices for momentarily stopping the streams, means controlled by said stop devices for moving said guide devices to carry said streams against said saw to cut off said lengths, said movement also serving to discharge the cut-off lengths from said guide devices.

7. In a machine for sawing a stream of material into lengths, a saw, guide devices for guiding said stream past said saw, said guide devices comprising a guide tube anterior of the saw and an open top trough posterior of the saw, a stop device on said guide trough for stopping the stream, means including an arm electrically operated in response to the stopping of said stream by said stop device for moving said guide device to carry said stream against said saw to cut off said lengths, said movement also serving to dump the cut-off lengths out of said open-top troughs.

8. In a machine for cutting streams of material into predetermined lengths, a framework, a drive shaft journalled in said framework longitudinally thereof, a circular saw secured to said drive shaft, a plurality of guide devices extending generally lengthwise of said framework and disposed generally about the periphery of said saw, each guiding device comprising a rock shaft journalled in said framework, a guide tube secured to said rock shaft on the anterior side of said saw, an open trough secured to said rock shaft on the posterior side of said saw, adjustable stop and contact devices secured to said trough, an arm secured to said rock shaft, a solenoid secured to one end of said arm, a return spring secured to the other end of said arm, electrical control devices connecting said contact devices and said solenoid, a plurality of feed rolls anterior of said guide tubes, each feed roll being generally in alignment with its guide tube, and means for feeding streams of material to said feed rolls.

9. In a machine for cutting streams of material into predetermined lengths, a framework, a drive shaft journalled in said framework longitudinally thereof, a circular saw secured to said drive shaft, a plurality of guide devices extending generally lengthwise of said framework and disposed generally about the periphery of said saw, each guiding device comprising a rock shaft journalled in said framework, a guide tube secured to said rock shaft on the anterior side of said saw, an open trough secured to said rock shaft on the posterior side of said saw, adjustable stop devices secured to said trough, means operated by said stop devices for independently swinging each guide device toward the saw, a plurality of feed rolls anterior of said guide tubes, each feed roll being in substantial alignment with its guide device, and means for feeding streams of material to said feed rolls.

10. In a machine for cutting streams of material into predetermined lengths, a support, a drive shaft journalled in said support longitudinally of the machine, a circular saw secured to said drive shaft, a plurality of guide devices extending longitudinally of said machine and disposed generally around the periphery of said saw, each guiding device comprising a rock shaft journalled on said support, and a straight tube secured to said rock shaft, said tube having a belled mouth, a plurality of feed rolls anterior of and adjacent the belled mouths of said guide tubes, each feed roll having a flat bottomed groove permitting lateral movement of the stream, said flat bottomed grooves being substantially in line with said straight tubes, and means for feeding streams of material to said feed rolls.

11. In a machine for cutting streams of material into predetermined lengths, a support, a drive shaft journalled in said support longitudinally of the machine, a circular saw secured to said drive shaft, a plurality of guide devices extending longitudinally of the machine and disposed generally around the periphery of said saw, each guiding device comprising a rock shaft journalled on said support, and a curved tube secured to said rock shaft, said tube having a belled mouth, a plurality of feed rolls anterior of and adjacent the belled mouth of said guide tubes, each feed roll having a V-shaped groove, said curved tubes having their belled mouths located substantially on the axis of their rock shafts and substantially in line with the V-grooves in the feed rolls, and means for feeding streams of material to said feed rolls.

12. In a multi-stream sawing machine, a framework, a circular saw journalled in said framework, a plurality of guide devices arranged about the periphery of said saw, a plurality of feed rolls disposed anteriorly of said guide devices comprising grooved rolls having their upper surfaces generally in line with said guide devices, upper, upper intermediate, lower intermediate and lower shafts for said rolls, two pulleys on said upper shaft both on one side of its roll, two pulleys on said lower shaft on opposite sides of its roll, a pulley on said upper intermediate shaft, a belt connecting said last-mentioned pulley and a pulley on said lower shaft, a pulley on said lower intermediate shaft and a belt connecting said last-mentioned pulley and a pulley on said upper shaft, a counter-shaft, pulleys on said counter-shaft and belts connecting said counter-shaft pulleys and the second pulleys on said upper and lower shafts, and means driving said counter-shaft.

ROBERT B. MUSE.